United States Patent [19]
Deshayes et al.

[11] Patent Number: 6,047,294
[45] Date of Patent: Apr. 4, 2000

[54] LOGICAL RESTORE FROM A PHYSICAL BACKUP IN A COMPUTER STORAGE SYSTEM

[76] Inventors: John Deshayes, 7 Castle Hill Rd., Hopkinton, Mass. 01748; Madhav Mutalik, 115 Colburn St., Northboro, Mass. 01532

[21] Appl. No.: 09/052,579

[22] Filed: Mar. 31, 1998

[51] Int. Cl.[7] .................................................. G06F 17/30
[52] U.S. Cl. ........................ 707/204; 707/202; 395/181; 395/182.01
[58] Field of Search .................. 707/1–10, 100–104, 707/200–206, 532; 712/200; 395/180, 181, 182.01–182.09, 182.1, 182.11–182.19

[56] References Cited

U.S. PATENT DOCUMENTS 5,655,096  8/1997  Branigin .................................. 712/200
5,960,449  9/1999  Nagaoka, et al. ....................... 707/532

OTHER PUBLICATIONS

EMC Data Manager Product Description Guide, 1998.
EMC Data Manager Symmetrix Connect User Guide, Dec. 1997.

*Primary Examiner*—Ruay Lian Ho
*Attorney, Agent, or Firm*—Wolf, Greenfield & Sacks, P.C.

[57] ABSTRACT

Method and apparatus for backing up and restoring data in a computer system is disclosed. A segment of data, such as a virtual disk partition, may be backed up at a physical level from a primary storage device to a backup storage device. A logical element within the segment of data, such as a data file, may be restored from the backup storage device to the primary storage device. In one embodiment, this is achieved by restoring the segment to a scratch memory area and using a client computer to logically restore the logical element.

26 Claims, 13 Drawing Sheets

LOGICAL RESTORE FROM A PHYSICAL BACKUP IN A COMPUTER STORAGE SYSTEM

FIELD OF THE INVENTION

This invention relates to data storage for computers, and more particularly to logical restores from a physical backup of the computer storage.

DISCUSSION OF THE RELATED ART

Virtually all computer applications (or programs) rely on storage. This storage can be used for both storing the computer code and for storing data manipulated by the code. (The term "data" refers to any information, including formatting information, executable code and data for manipulation by an application program.)

Storage technology has developed in a variety of different directions. Accordingly, a wide variety of storage technologies are available. It has become impractical, therefore, for the person writing the computer application to also be responsible for detailed control over how data is stored on the storage system.

For this (and other) reasons, application programs typically run on an operating system (e.g., Unix, Windows, MS DOS, Linux, and the many variations of each). Once again, however, the operating system may be used with a variety of storage systems.

It would be highly inefficient to have to change the operating system, or the application programs, every time a change is made to physical storage. As a result, various layers of abstraction have evolved for viewing how data is actually stored in the storage system.

FIG. 1 illustrates one way of viewing the layers of abstraction. At the top level 10, the application program may assume that data is stored in a manner that has very little to do with how the data is placed onto the physical device. For example, the application may view the storage system as containing a number of directories and data files within the directories. Thus, in an application written for use in the Unix operating system, the application will assume that files are stored according to the Unix directory structure (including hierarchical directories and files located within the directories). This assumed organization of physical storage may have very little to do with how that data is actually stored onto the actual storage devices. This view may be referred to as the "logical view" because of the separation between the logical view of data from the application level is divorced from any view of how the data is physically stored.

The application level 10 then interfaces with the file system level 12. The file system level is concerned with how files are stored on disks and how to make everything work efficiently and reliably. Thus, the file system level may be responsible for storing directory structure, and for breaking up files into constituent data blocks for storage onto a physical storage system. For example, in most implementations of Unix, each file has an associated I-node. This node may contain accounting and protection information and, additionally, a set of pointers to data blocks.

Relatively early in the development of computer systems, disk drives became a fundamental device for storage. Accordingly, computer operating systems have been developed assuming that memory will rely on input/output ("I/O") to a disk drive. The file system 12, therefore, may assume one or more "volumes" which correspond to a physical storage unit such as a disk drive (or any other unit of storage), with data stored in blocks on the disk drive.

The demand for storage to be available for use by applications has sky rocketed. As a result, a number of separate physical devices may be required to accommodate the total amount of storage required for a system. In addition, storage systems are often changed or reconfigured.

To insulate the operating system from any changes within the physical device storage system, some mechanism is often employed to flexibly map a standard (volume) view of physical storage onto an actual physical storage system. The logical volume manager 14 of FIG. 1 can help achieve this function by mapping the file system view of data storage into an intermediate layer.

Finally, the actual storage reading and writing (and, potentially, mapping onto physical storage devices) occurs within the physical storage system level 16, as illustrated in FIG. 1. Thus, for example, the logical volume manager may map the file system level view of data into volume sizes corresponding to fixed physical storage segment sizes for storage on a physical device (e.g, block sizes). The physical storage system level may then map the logical volume manager level volumes onto physical storage segments (e.g., hyper-volumes discussed below).

Logical volume managers have been implemented for use with the HP-UX and VERITAS operating systems, as examples. The Symmetrix line of storage systems, available from EMC Corporation, of Hopkinton, Mass., is one system capable of mapping hyper-volumes onto physical devices. (The Symmetrix product line of integrated cached disk arrays is described in numerous publications form EMC Corporation, including the Symmetrix model 55xx product manual, p-n200-810-550, rev.f, February, 1996.)

FIG. 2 illustrates an example of the mapping that may be performed by the logical volume manager 14 and the physical storage system 16, to store data onto actual physical devices. The application/file system's view of the storage system contemplates three separate storage devices—volume A 20, volume B 21, and volume C 22. Thus, as far as the file system level 12 can discern, the system consists of three separate storage devices 20–22. Each separate storage device may be referred to as a "virtual volume," or "virtual disk." This reflects the operating system's view of the storage device structure may not correspond to the actual physical storage system implementing the structure (hence, "virtual"). Unlike the application level 10, however, the file system 12 perspective is as if the file system 12 were dealing with raw physical devices or volumes.

As far as the file system level is concerned, the virtual volumes may be divided up into "partitions," which are continuous segments of storage. These partitions are, in fact, "virtual" partitions, because the partition may actually be stored across a variety of physical storage segments (e.g., hyper-volumes).

In FIG. 2, the data is physically stored on the physical storage devices 24–26. In this particular example, although there are three physical devices 24–26 and three volumes 20–22, there is not a one to one mapping of the virtual volumes to physical devices. In this particular example, the data in volume A 20 is actually stored on physical devices 24–26, as indicated at 20a, 20b and 20c. In this example, volume B is stored entirely on physical device 24, as indicated at 22a, 22b. Finally, volume C is stored on physical device 24 and physical device 26 as indicated at 21a, 21b.

In this particular example, the boxes 20a–20c, 21a–21b and 22a–22b represent contiguous segments of storage within the respective physical devices 24–26. These contiguous segments of storage may, but need not, be of the same size. The segments of storage may be referred to as "hyper-volumes," and correspond to segments of physical storage that can be used as components when constructing a virtual volume for use by the file system.

Array management software running on a general purpose processor (or some other mechanism such as a custom hardware circuit) 23 translates requests from a host computer (not shown) (made assuming the logical volume structure 20–22) into requests that correspond to the way in which the data is actually stored on the physical devices 24–26. In practice, the array management software 23 may be implemented as a part of a unitary storage system that includes the physical devices 24–26, may be implemented on a host computer, or may be done in some other manner.

In FIG. 2 the array management software 23 performs the functions of both the logical volume manager 14 and the physical storage level 16, by mapping the file system's virtual volumes 20–22 into segments that can be stored onto physical devices 24–26. The array management software 23 also performs the functions of the physical storage system level 16, by determining where to store the hyper-volumes 20A–20C, 21A–21B and 22A–22B.

The physical storage devices shown in the example of FIG. 2 are disk drives. A disk drive may include one or more disks of a recording media (such as a magnetic recording medium or an optical recording medium). Information can be written and read from this storage medium for storage purposes. The physical storage devices for use with the present invention may, however, be any other storage mechanism.

In a system including an array of physical disk devices, such as disk devices 24–26 of FIG. 2, each device typically performs error detection and/or correction for the data stored on the particular physical device. Accordingly, each individual physical disk device detects when it does not have valid data to provide and, where possible, corrects the errors. Even where error correction is permitted for data stored on the physical device, however, a catastrophic failure of the device would result in the irrecoverable loss of data.

Accordingly, storage systems have been designed which include redundant storage capacity. A variety of ways of storing data onto the disks in a manner that would permit recovery have developed. A number of such methods are generally described in the RAIDbook, A Source Book For Disk Array Technology, published by the RAID Advisory Board, St. Peter, Minn. (5th Ed, February, 1996). These systems include "RAID" storage systems. RAID stands for Redundant Array of Independent Disks.

FIG. 3A illustrates one technique for storing redundant information in a RAID system. Under this technique, a plurality of physical devices 31–33 include identical copies of the data. Thus, the data M1 can be "mirrored" onto a portion 31a of physical device 31, a portion 32a of physical device 32 and a portion 33a of physical device 33. In this case, the aggregate portions of the physical disks that store the duplicated data 31a, 32a and 33a may be referred to as a "mirror group." The number of places in which the data M1 is mirrored is generally selected depending on the desired level of security against irrecoverable loss of data.

In a mirror group, the copies are "linked." That is, any update to one mirror causes an update to each other mirror in the group.

FIG. 3A shows three physical devices 31–33 which appear to be located in close proximity, for example within a single storage system unit. For very sensitive data, however, one or more of the physical devices that hold the mirrored data may be located at a remote facility.

"RAID 1" is an example of data redundancy through mirroring of data. In a RAID 1 architecture, a number of different mechanisms may be used for determining how to access and update data to improve, for example, performance of the storage system. In any event, a RAID 1 architecture certainly has the ability to recover lost data. Unfortunately, the RAID 1 architecture multiplies the cost of physical storage by the number of "mirrors" included in the mirror group.

FIG. 3B illustrates a solution that requires less added storage. In FIG. 3B, data is stored at locations 34a–34d. In this particular example, the physical device 33 includes parity information P1 at 35a, 35b. The parity information is generated by a simple exclusive-OR ("XOR") of the corresponding bits of data. Thus, the parity information P1 would be generated by XORing the corresponding bits of the data D1 and data D2.

A variety of mechanisms are known for distributing the parity information on the physical devices. In the example shown in FIG. 3B, all of the parity information is stored on a single physical device 33. In other cases, the parity information may be distributed across the physical devices.

FIG. 4 illustrates the concept that, within a given disk array, there is no need for all of the data to follow the same redundancy rule. In FIG. 4, a first group of storage segments on physical devices 40–42 form a mirror group 44. In the mirror group 44, the entire contents of a single logical volume (HV-A) are mirrored on three different physical devices 40–42.

In FIG. 4, a single virtual volume is stored on the fourth physical device 43, without any redundancy information, as indicated at 46.

Finally, a last group of data segments 45, on all four physical devices 40–43, implement a parity redundancy scheme. In this particular example, the parity information is stored in segments of memory on two different physical devices 42–43, as indicated at 47a and 47b.

The storage system of FIG. 4 contains redundant information that permits recovery from errors, including use of a mirror for data located at a remote facility, that also permits recoveries from catastrophic failure.

Further mechanisms for backup of data, however, are still required. For example, a number of events may arise where an old file still needs to be restored. For example, if a software or hardware error causes miswriting of data onto a mirrored disk (e.g., HV-A-1 of FIG. 4), the data may be corrupted on all of the mirrors (e.g., each copy of HV-A-1). Accordingly, fuller backup and restore system may be required.

FIG. 5 illustrates one system for additional backup. In FIG. 5, a computer or client 50 performs its operations using storage system 52. The client 50 may be any conventional computing system, such as a network client available from Sun Microsystems, and running the Solaris operating system (a version of Unix), an HP client running HP-UX (a Hewlett-Packard client, running a Hewlett-Packard version of the Unix operating system) or an IBM client running the AIX operating system (an IBM version of Unix) or any other system with an associated operating system. The storage system 52 may be any conventional storage system, including a Symmetrix storage system, as described above. The client 50 may be connected to many other devices over a network 56.

A backup storage system 54 is also attached to the network 56. The backup storage system 54 includes a backup storage device (which may be disk drives, tape storage or any other storage mechanism), together with a system for placing data into the storage and recovering the data from that storage.

To perform a backup, the client 50 copies data from the storage system 52 across the network 56 to the backup storage system 54. This process can be explained in greater detail with reference to FIG. 1. The storage system 52 corresponds to the actual physical storage 16 of FIG. 1. For the client 50 to write the backup data over the network 56 to the backup storage system 54, the client 50 first converts the backup data into file data—i.e., gets the data from the physical storage system level 16, and converts the data into application level format (e.g. a file) through the logical volume manager level 14, the file system level 12 and the application level 10. Thus, an actual data file may be communicated over the network 56 to the backup storage device 54. When the backup storage device 54 receives the data file, the backup storage system 54 can take the application level 10 data file, convert it to its appropriate file system level 12 format for the backup storage system, which can then be converted through a logical volume manager 14 level and into physical storage 16.

This form of backing up data may be referred to as "logical-logical" backup. That is, the logical data is backed up on the backup storage device 54. The data to be backed up is presented independent of the manner in which it is physically stored on storage system 52 at the physical storage system level 16, independent of the file system level mechanisms on the client 50, and independent of how data is stored on the backup storage device 54.

The EDM (EMC Data Manager) line of products is capable of logical-logical restore over a network, as described in numerous publications available from EMC, including the EDM User Guide (Network) "Basic EDM Product Manual".

While the method and apparatus of the present invention may be described with reference to the systems and concepts described above, this is not intended to be limiting. The present invention has broader application. Certain aspects of the invention may be applied to any storage system. Accordingly, the invention is only limited by the claims set forth below.

SUMMARY OF THE INVENTION

According to one embodiment of the present invention, a method of backing up and restoring data in the computer system is disclosed. According to this embodiment, a physical backup of a segment of storage is performed by copying the segment of storage onto a backup storage device, the segment of storage being used to store a plurality of logical elements. The method continues by logically restoring one of the logical elements stored in the segment of storage. The logical element may be an application level file, the segment of storage may correspond to a partition of a virtual disk and the segment of storage may be stored across a plurality of physical storage elements (such as hyper-volumes) on a primary storage device.

According to another embodiment of the present invention, a method of restoring data from a backup storage device to a primary storage device is disclosed. According to this embodiment, a copy of a segment of storage is restored to a scratch area. The method continues by logically restoring a logical element stored in the segment of storage from the copy that had been restored to the scratch area. The scratch area may be on the primary storage device.

According to another embodiment of the present invention, a method of backing up and restoring data used in a computer system having a primary computer, a primary storage device and a backup storage device is disclosed. This embodiment includes steps of using the backup storage device to control backing up a segment of storage by copying, at a physical level, the segment of storage from the primary storage device to the backup storage device. The method also includes a step of using the primary computer to logically restore a logical element stored in the segment of storage.

According to another embodiment of the present invention, a backup storage system is disclosed for backing up a storage device used by a primary computer. This embodiment includes means for controlling a physical backup of a segment of storage stored on the storage device and means for logically restoring a logical element from the segment of storage. According to this embodiment, the physical backup may be performed over a direct connection between the primary storage device and the backup storage system.

DETAILED DESCRIPTION

Figure 1:
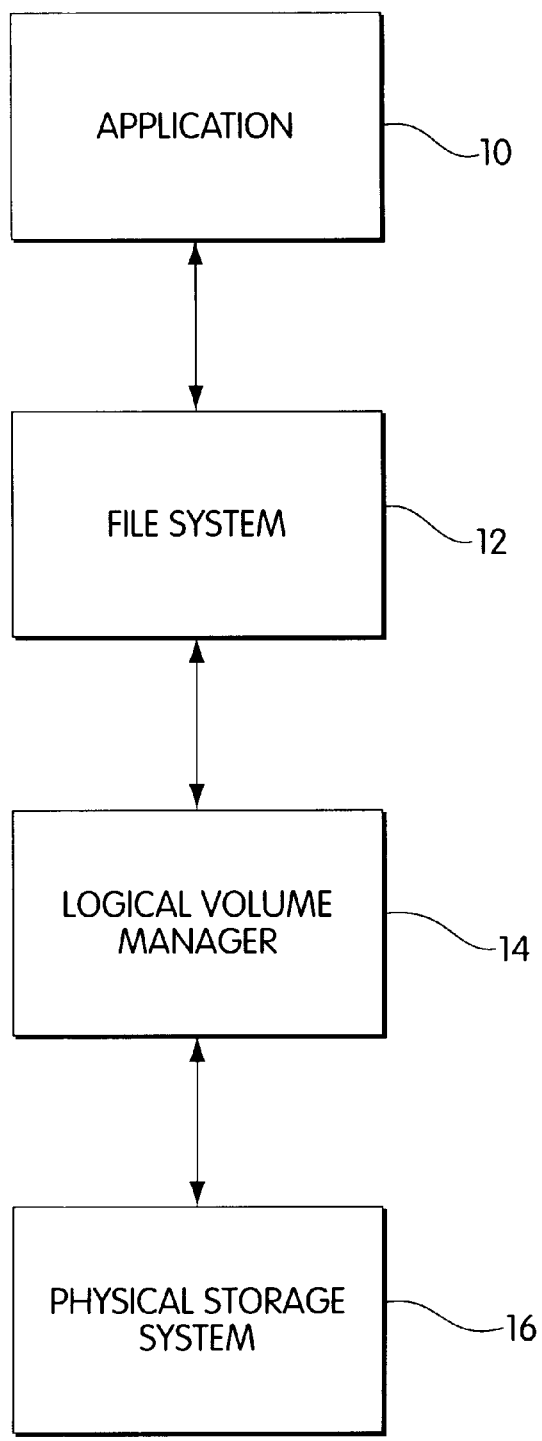
FIG. 1 illustrates an example of conversion of application level data to storage in a physical system and vice versa.

Logical-logical backup can be a particularly convenient form of backup. The backup storage system 54 may need to be capable of interaction with a variety of different clients 50. For example, it may be desirable to have a backup storage system 54 that can backup data from both a Solaris operating system and HP-UX operating system. By providing logical level data across the network 56 to the backup storage system 54, the backup storage system 54 can take that data and convert the data as appropriate for storage in its own physical storage system (i.e., take the data at the application level 10 and convert it to the file system level 12, logical volume manager 14 and physical storage system 16, as each of those levels is possibly uniquely implemented in the backup storage system 54). Thus, if the client 50 is running the HP-UX operating system and the backup storage system 54 is using a Solaris operating system, the backup storage system 54 can save and retrieve data according to the formats used in the Solaris operating system. If data were copied directly from the storage system 52 to the backup storage system 54, the stored data would depend on the file system level 12 formats for the client 50 (here, HP-UX). The backup storage system 54 would then be unable to read or examine that data because it uses different file system level formats (here, Solaris).

Figure 5:
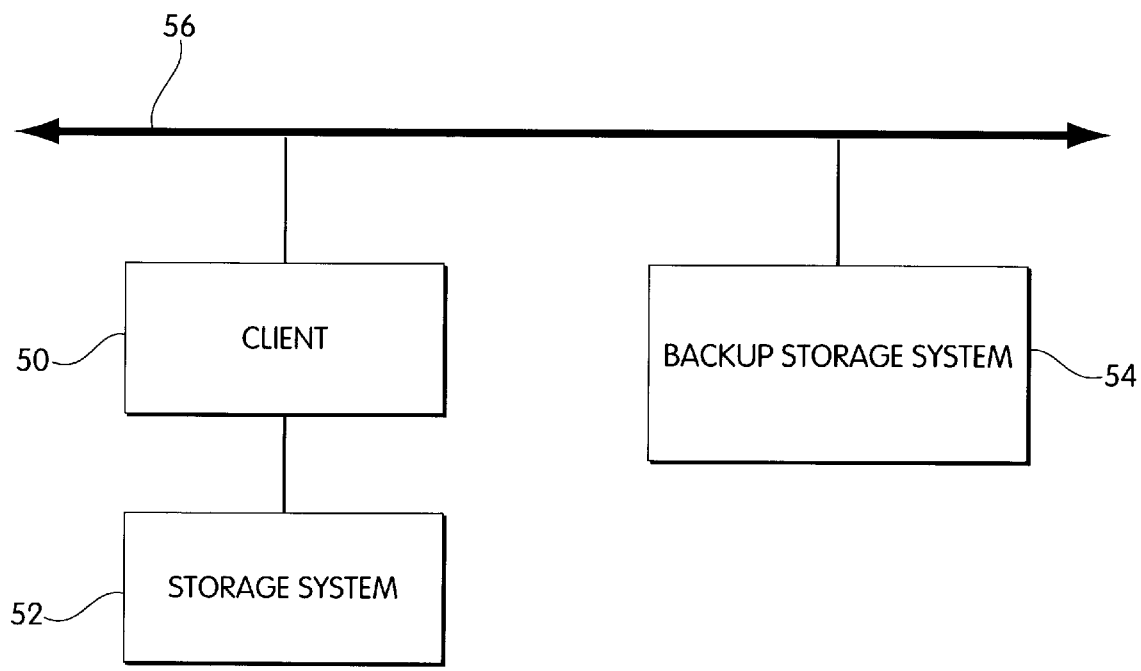
FIG. 5 illustrates an example of a backup storage system.

A problem with the backup system described with reference to FIG. 5, however, is that the backup process requires significant traffic on the network 56. Moreover the backup process can be slow, if the network medium 56 is crowded with traffic or can not support high speed data transfer. In addition, the structure illustrated in FIG. 5 may require significant resources of the client 50 on storage system 52. The client 50 and storage system 52 must fully parse the data from the physical storage level (16 of FIG. 1) to the application level (10 of FIG. 1).

Figure 6:
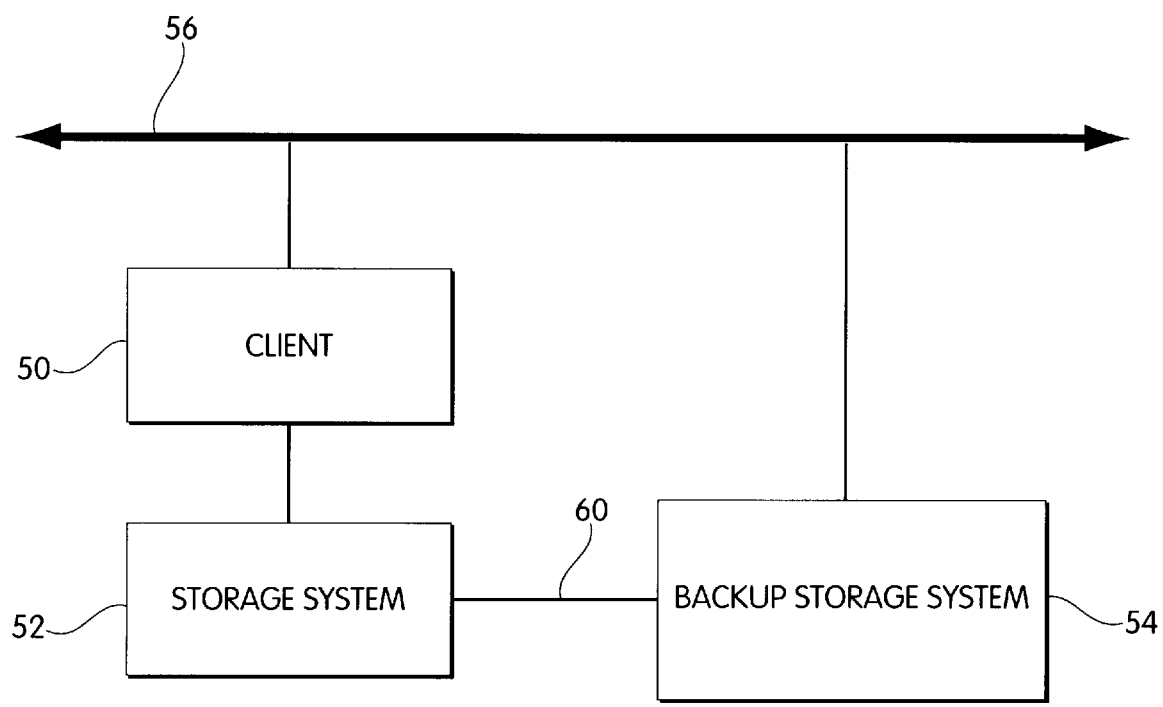
FIG. 6 illustrates one embodiment of a backup storage system that includes a mechanism for direct backup of data on the primary storage system.

FIG. 6 illustrates one embodiment of an alternative structure that can alleviate some or all of the above problems. In this system, a direct connection 60 is established between the storage system 52 and the backup storage system 54. In this embodiment, the backup storage system may be a system as generally described in EMC Data Manager: Symmetrix Connect User Guide, P/N 200-113-591, Rev. C, December 1997, available from EMC Corporation of Hopkinton, Mass. The direct connection 60 may be a high speed data channel, such as a SCSI cable or one or more fiber-channel cables. In this system, a user may be permitted to backup data over the network 56, or the direct connection 60.

Figure 7:
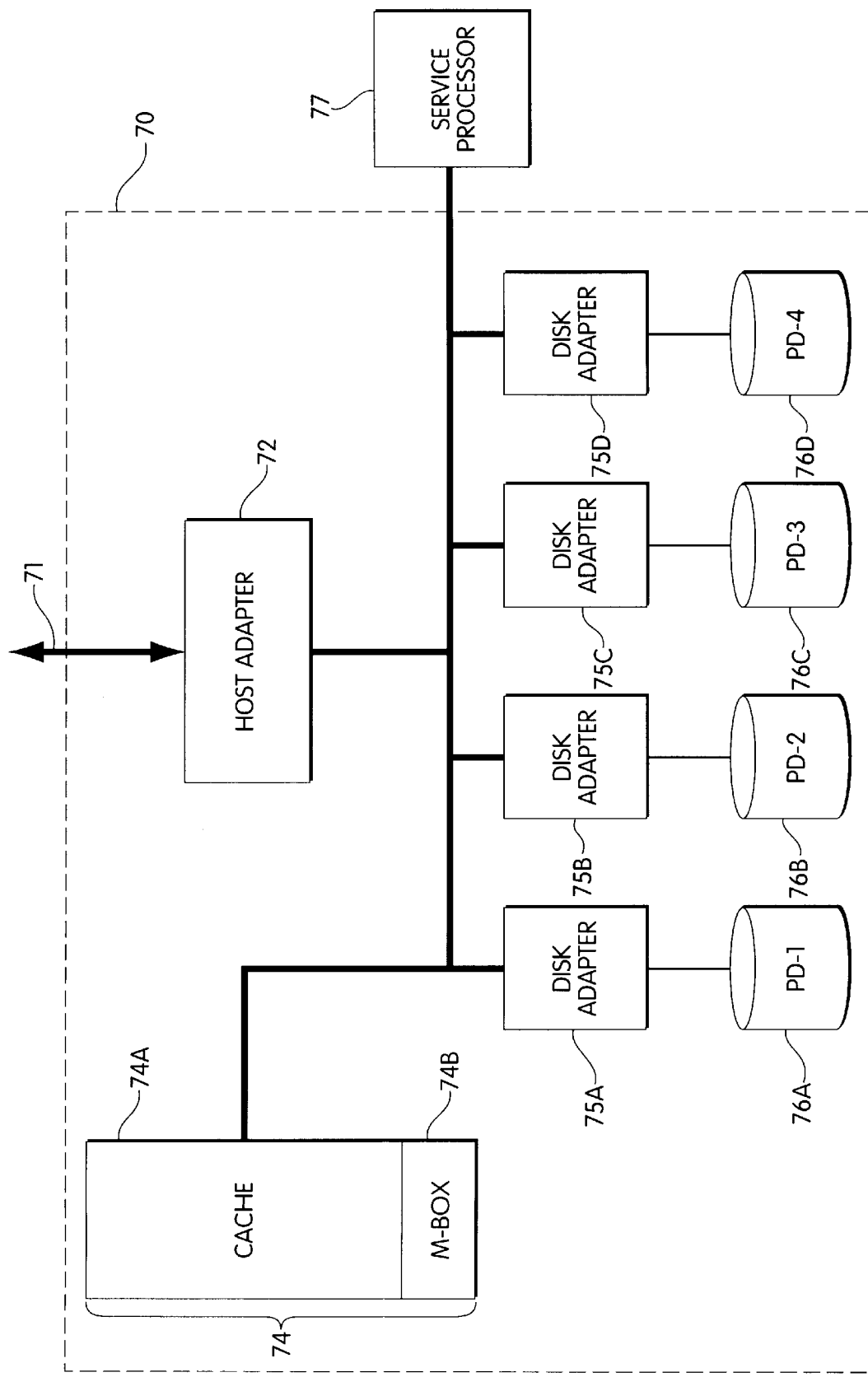
FIG. 7 illustrates an example of a storage system.

FIG. 7 shows a storage system 70 that may be used as the storage system 52 of FIG. 6. The client 50 may be connected to the storage device using a channel or bus 71. The channel for communication with the client 50 can be any suitable connection such as a Small Computer System Interface ("SCSI") or Enterprise Systems Connection Architecture ("ESCON"). While only one communication channel 71 into the storage system 70 is shown in FIG. 7, other channels may be included. (While the method and apparatus of the present invention may be described with reference to the storage system of FIG. 6 and the physical storage system (and associated features and methods) of FIG. 7, this is not intended to be limiting. The present invention has broader application. Certain aspects of the invention may be applied to any storage system.)

Figure 2:
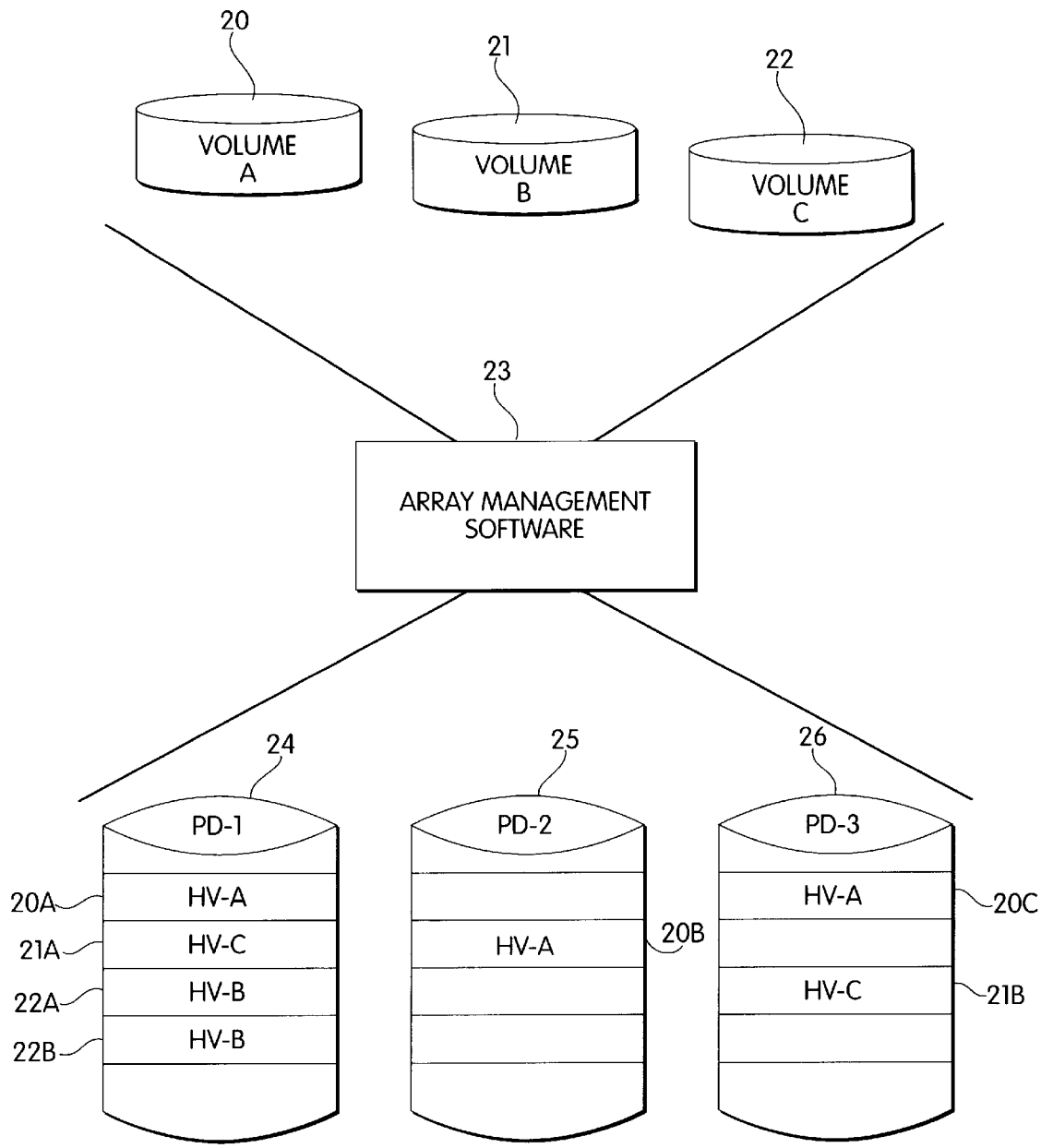
FIG. 2 illustrates an example of the relationship between logical volumes and physical storage devices.
Figure 3A:
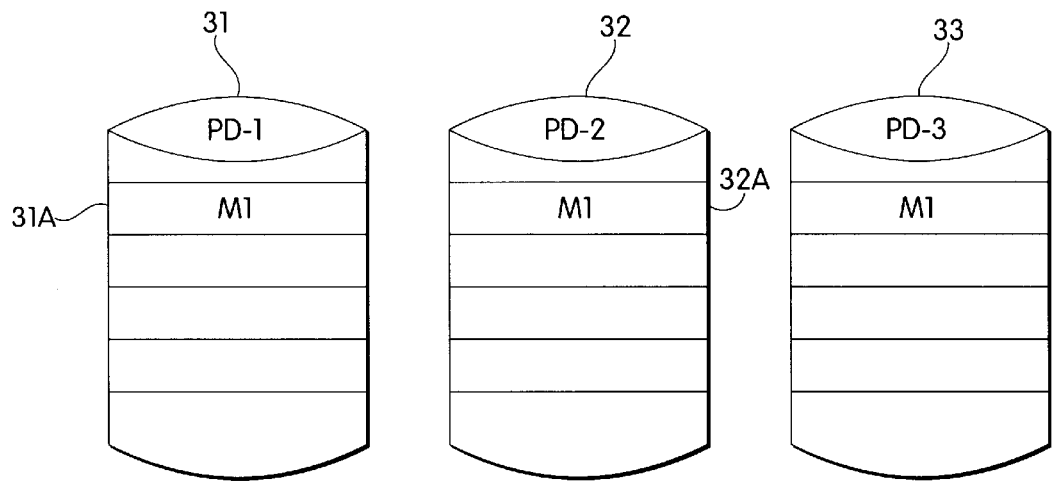
FIG. 3A illustrates an example of mirroring on different physical storage devices.
Figure 3B:
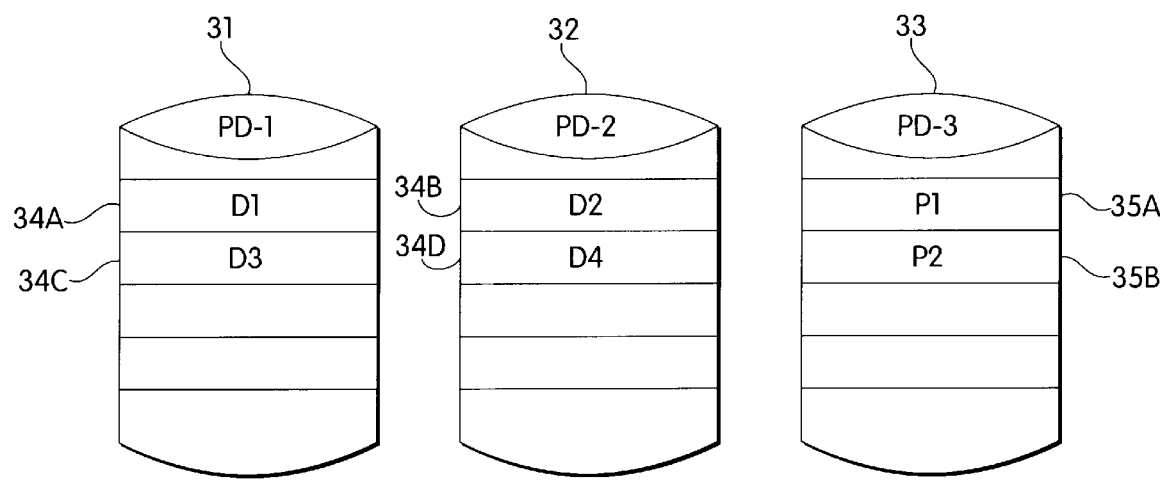
FIG. 3*b* illustrates an example of redundant parity information on physical storage devices.

Within the storage system 70 is a host adapter 72. In this particular embodiment, the host adapter 72 is responsible for managing and translating read and write requests from the host computer (e.g., client 52 or backup storage system 54), which are based on the virtual disk structure (e.g., from the file system or logical volume manager level), into one or more requests corresponding to how data is stored on the actual physical storage devices 76a–76d of the storage system 70. Thus, in this embodiment, the host adapter 72 implements at least some of the array management software 23 functions of FIG. 2. The host adapter 72 can be implemented in any of a number of ways, including using a general purpose processor or a custom hardware implementation. In addition, multiple host adapters may be included to facilitate having additional I/O channels for the storage system 70.

The host adapter 72 communicates with the other components of the storage system 70 using bus 73. The bus 73 may be any suitable communication element, including use of SCSI, ESCON, and other bus protocols.

Access to the physical storage devices 76a–76d is controlled through the use of disk adapters 75a–75d. The disk adapter 75a–75d can also be implemented using a general purpose processor or custom hardware design. In the embodiment illustrated in FIG. 7, a disk adapter is provided for each physical storage device. A disk adapter can, of course, have more than one storage device attached to it. In addition, disk adapters may include secondary connections to the physical storage devices of another disk adapter. This permits recovery from failure of one disk adapter by shifting its functions to the second disk adapter.

In the embodiment of FIG. 7, reading and writing to the physical storage device 76a–76d through the disk adapters 75a–75d is facilitated through use of a cache 74. The cache 74 may be a random access memory having greater speed than the disk drives. When reading data, if the data is being temporarily stored in the cache, the read request can be fulfilled more quickly by taking the data from the cache 74. Similarly, when writing data, the data to be written can be stored in the cache. The other components of the system can proceed, while the data is written from the cache to the applicable physical storage device.

Any of a variety of mechanisms can be used to implement and manage the cache. An example of such a mechanism is included in U.S. Pat. No. 5,537,568, entitled "System for dynamically controlling cache manager maintaining cache index and controlling sequential data access," issued on Jul. 16, 1996. Similarly, writes may be accomplished through the cache using any of a variety of mechanisms and strategies. One mechanism for writing from the cache is to store the data to be written in the cache, and mark a "write pending" bit. When the write pending bit is encountered, the applicable data can be written to the disk. This technique is described generally in U.S. Pat. No. 5,341,493, entitled "Disk storage system with write preservation during power failure," issued on Aug. 23, 1994.

The cache may be divided into more than one area. For example, the cache may include an area 74a for storing data being read or written from physical storage devices 76a–76d. The cache may further include a "mailbox" area 74b. The mailbox area 74b may be used to facilitate communications among the disk adapters 75a–75d and with the host adapter 72. For example, each disk adapter may have its own area within the mailbox 74b. Each of the disk adapters 75a–75d can post or read information from the applicable mailbox area 74b, to communicate status and other information.

A service processor 77 may be coupled to the bus 73 of the storage system 70. The service processor 77 may include a display, keyboard and other I/O devices to permit an operator to use the service processor 77 for configuring the components of the storage system 70 and for running or initiating diagnosis and maintenance facilities.

Returning to FIG. 6, when the storage system 52 is a Symmetrix product, such as the one generally described with reference to FIG. 7, the direct connection 60 may be connected from the backup storage system 54 to the storage system 52 through a host adaptor (e.g., 72 of FIG. 7). Thus, connection 60 may be connected similar to connection 71, as shown in FIG. 7.

Figure 4:
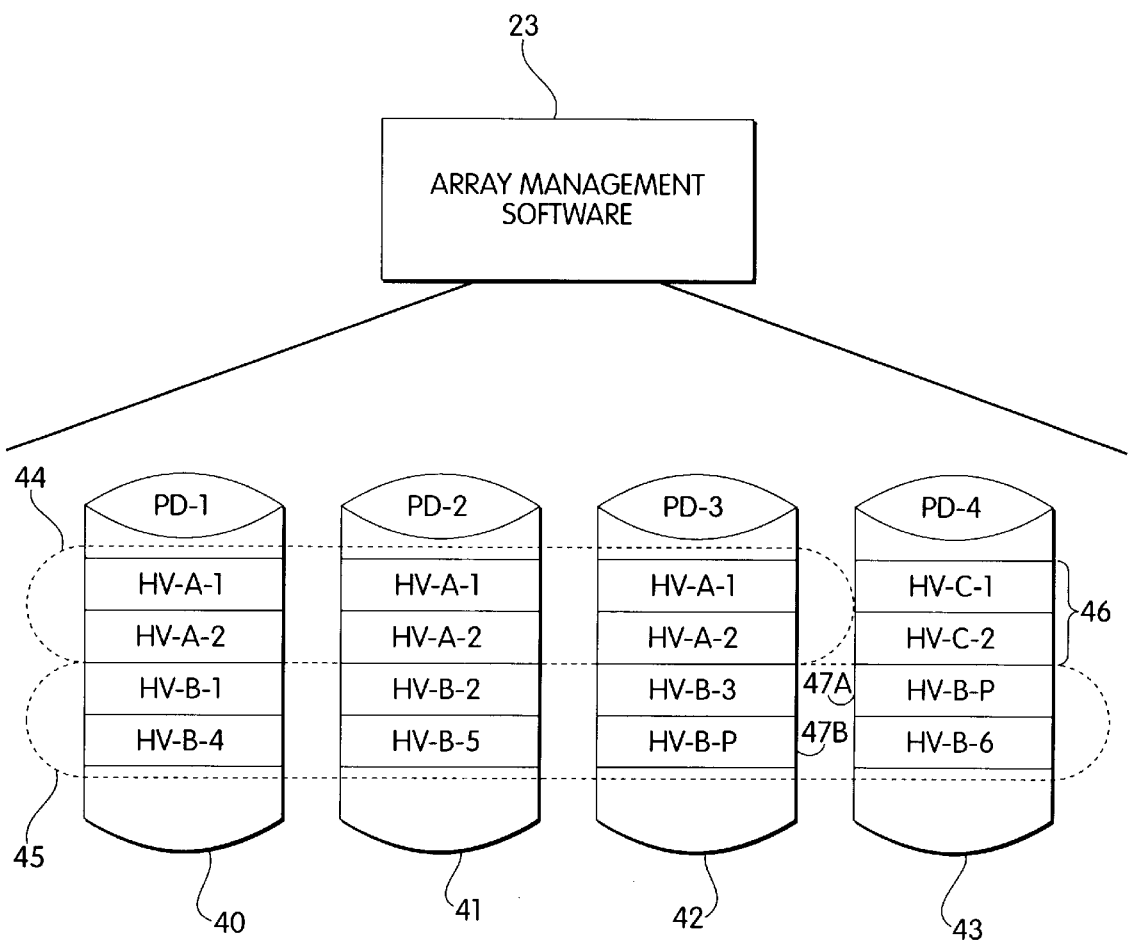
FIG. 4 illustrates an example of multiple redundancy groups within a single array of storage devices.

For high speed data transfer using the direct connection 60 of FIG. 6, data may be copied directly from physical storage devices 76a–76d (of FIG. 7) to the backup storage system. The task remains, however, of determining which hyper-volumes (or portions of hyper-volumes) should be backed up. For example, consider backup for data base files in an Oracle data base application (such as Oracle versions 7.2.x, 7.3.x and 8.0.4, available from Oracle Corp. of Redwood, Calif.). Files may be stored on any one, or across any number, of hyper-volumes located in any particular set of locations across the physical storage devices 76a–76d (as explained above with reference to FIGS. 2 and 4).

As discussed below, the backup and restore process may also depend upon whether the file system level (12 of FIG. 1) on the client (50 of FIG. 6) is different than the file system level (12 of FIG. 1) on the backup storage system (54 of FIG. 6). For example, the client 50 may be using one version of Unix (e.g. HP-UX) while the backup system 54 is using a different version of Unix (e.g., Solaris). Each will be discussed below.

Figure 8:
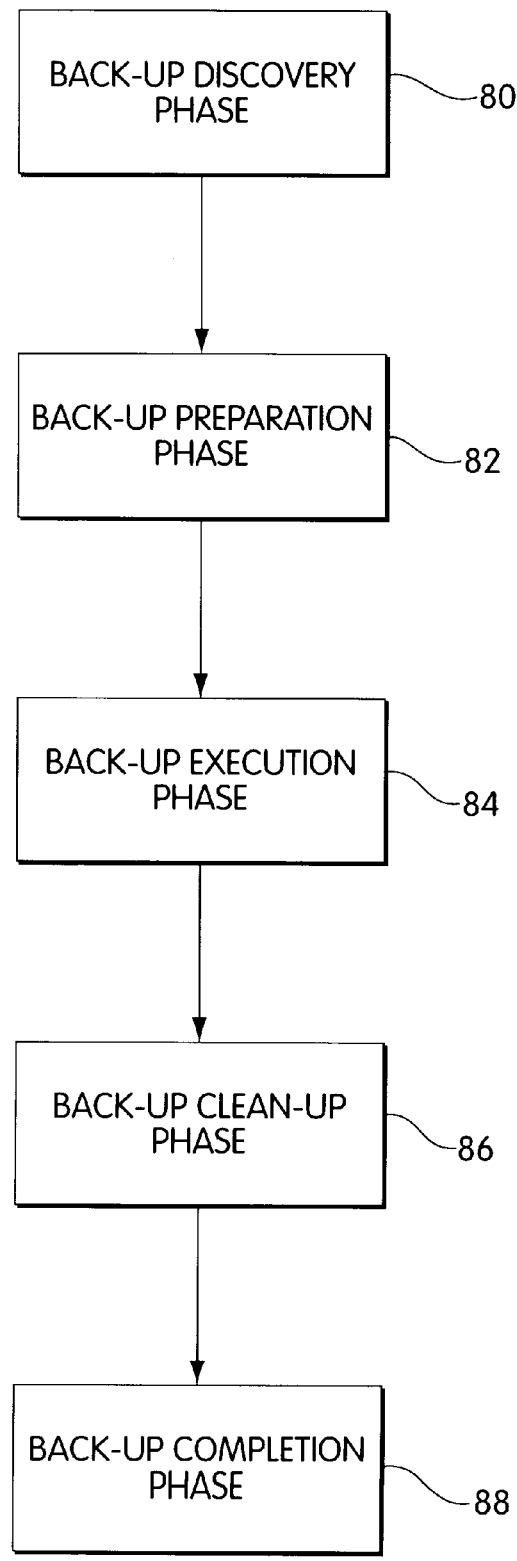
FIG. 8 illustrates one embodiment of a method for backing up data.

FIG. 8 illustrates one embodiment of a method of performing a backup using the system illustrated in FIG. 6 and over the direct connection 60. The method begins at a step 80, where a discovery process is performed. In the discovery process, software identifies the physical storage segments (e.g., hyper-volumes, or portions of hyper-volumes) that are required to be backed up. This process is discussed in greater detail below. The software that performs the discovery phase may be located on the client 50, the storage system 52 or through an independent controller (not shown). Alternatively, custom or semi-custom hardware may be used to perform some or all of these functions.

At a step 82, a backup preparation phase process is performed. This backup preparation phase places the storage system 52 into a state permitting backup to be performed. The backup preparation phase step 82 is discussed in greater detail below.

At a step 84, a backup execution phase process is performed. In this step, the actual backup of the physical storage identified at step 80 is performed. The hyper-volumes are copied from storage system 52 over the direct connection 60 to the backup storage system 54. For example, hyper-volumes may be transferred from a Symmetrix storage system 52, over a SCSI cable, to an EDM unit. The EDM unit may then control storing the backed up hyper-volumes onto a tape media.

At a step 86, a backup cleanup phase is performed. The cleanup phase restores the storage system 52 to its full operational condition, as described in greater detail below.

At a step 88, the backup process is completed and any remaining network or backup monitoring is performed (such as reporting results and logging information in a log file).

Figure 9:
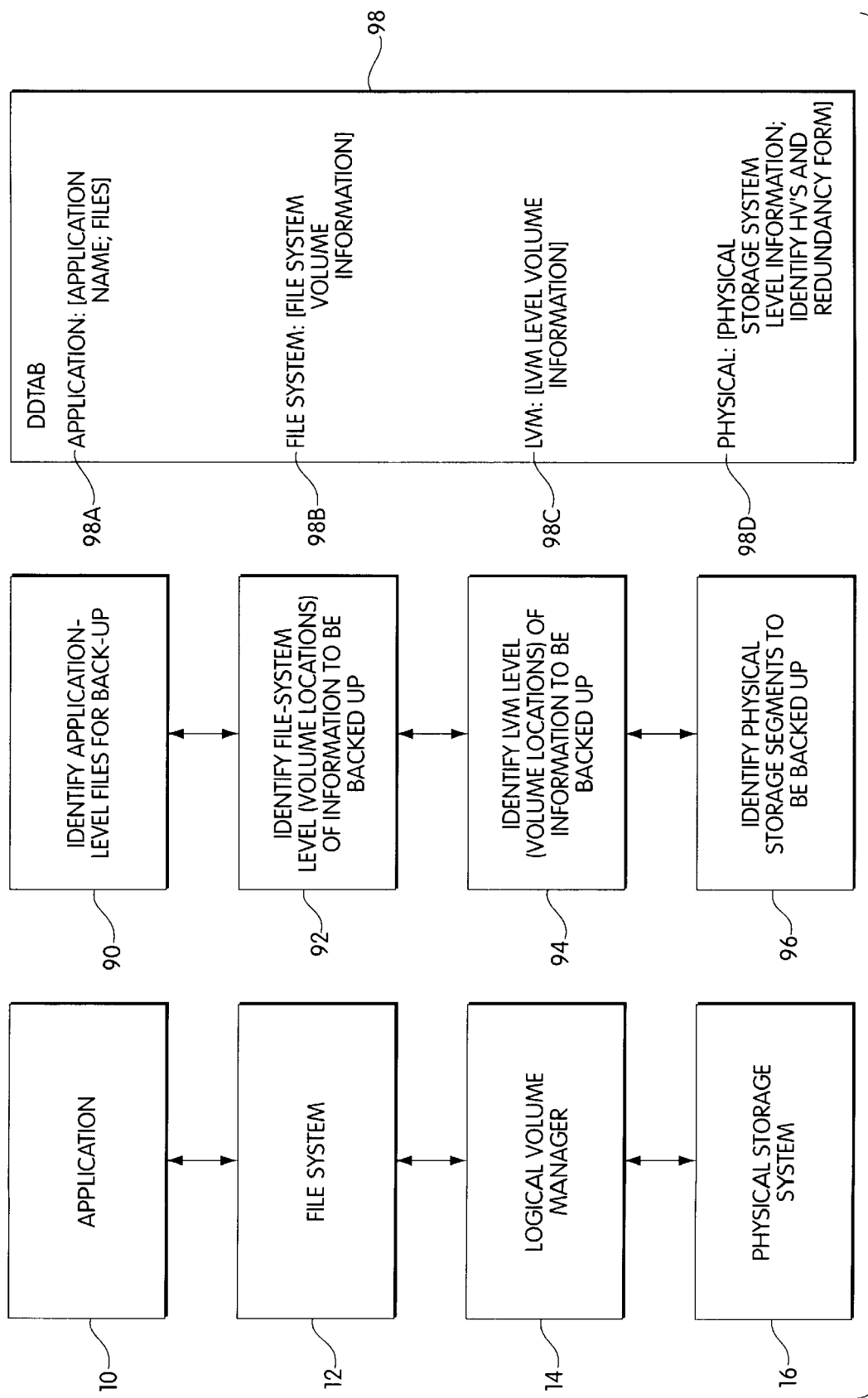
FIG. 9 illustrates one embodiment of preparing a discovery data table for use in backing up data.

FIG. 9 illustrates one embodiment of a method for conducting the discovery phase (steps 90–96) and a resulting discovery data table ("DDTAB") 98. This process may be explained using the example of memory abstraction levels described with reference to FIG. 1.

At the application level 10, the discovery phase begins at a step 90 by identifying application level files to be backed up. For example, if the application is an Oracle data base program, the Oracle data base program would identify the constituent components of the data base which needs to be backed up (e.g., all the files for a complete database backup or only those files required for backing up table spaces or portions of table spaces). When the application level files have been identified, a corresponding entry is made into the DDTAB file 98, indicating the application name and files, as illustrated at 98a. Other application level details may be included in the DDTAB file 98, the DDTAB file 98 shown in FIG. 9 being only illustrative.

Once the particular application level files have been identified, at a step 92 and corresponding to the file system level 12, the file system level information is identified. This identification process determines the (file system level) volume locations of the information to be backed up. A corresponding entry 98b in the DDTAB file 98 is made for the file system information.

At a step 94 and corresponding to the logical volume manager level 14, the logical volume manager level information is determined for the information to be backed up. Again, this may correspond to volume locations, but is one step closer to the manner in which the information is physically stored on the physical storage system 52. As above, the logical volume manager level information 98c is stored in the DDTAB file 98.

Finally, at a step 96 and corresponding to the physical storage system level 16, the actual physical storage segments (e.g., hyper-volumes) to be backed up are identified. Similar to the above, the physical storage information 98d is stored in the DDTAB file 98. This information may include an identification of the hyper-volumes and the form of redundancy used (e.g., mirrored information or another RAID redundancy system). In some cases, the hyper-volume information may specify a smaller region within the hyper-volume where data is stored.

Thus, the steps 90–96 may be similar to the methods that an application running on a client 50 would use to access data stored in a physical storage system 52. That is, the application determines the particular files that are to be accessed, the file system and logical volume manager determine the virtual location(s) of the file and the physical storage system level determines where within the physical storage system that data is stored (e.g., which hyper-volumes include information for the file).

The steps 90–96 may be performed using software resident on the client 50, storage system 52, the backup storage system 54, on a separate processing component dedicated for this purpose or through some other mechanism. In addition, various steps might be performed by software components located in different places. For example, step 90 (at the application level) may be performed on the client; step 92 (at the file system level) may be performed on the client 50; the logical volume manager level step 94 may be performed on the client 57; but the step 96 of identifying physical storage segments might be performed on the storage system 52.

The actual backing up of the data may be controlled by the backup storage system 54. In particular as described above, if the DDTAB file 98 has been sent to the backup storage system 54, the backup storage system 54 will know which hyper-volumes need to be copied from the storage system 52, and can directly read that data over the direct connection 60.

Returning to FIG. 8, a backup preparation phase may be performed at step 82 before performing the actual execution. In addition, a clean up phase 86 may be performed after execution of the backup.

Figure 10:
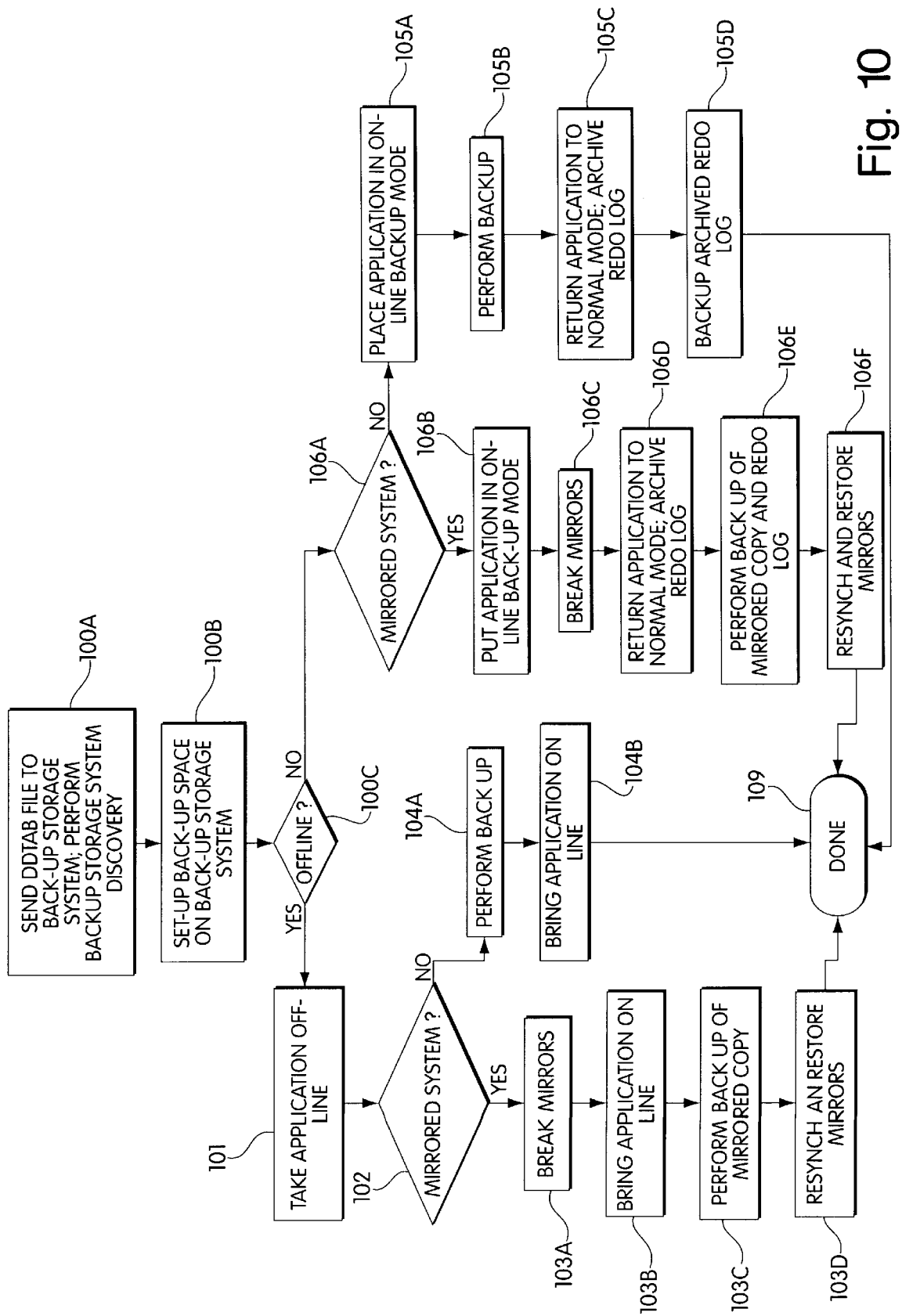
FIG. 10 illustrates one embodiment of a method for backing up data in a storage system.

FIG. 10 illustrates one embodiment for performing these tasks. At a step 100a, the DDTAB file is sent from the client 50 or physical storage system 52 to the backup storage system 54. As described below, the DDTAB file can be used to determine what physical storage segments on the physical storage system 52 need to be backed up and what backup storage space needs to be made available to receive a copy of the data from those physical storage segments. In the embodiment of FIG. 6, the DDTAB file may be sent from the client 50 to the backup storage system 54 over the network 56.

The backup storage sytem 54 may then build its own layered representation of the backup information, e.g., create its own DDTAB file, but building it from the physical storage level (98d) up. Thus, the backup storage system 54 may begin with the hyper-volume information from the communicated DDTAB file 98 and build corresponding LVM, file system and application level representation of the backed up data. Thus, when a restore is later requested, the backup storage system will have a record specifying where the data is stored on the backup storage system 54 memory system and how that is intended to correspond to the physical, virtual and logical memory structure of the client 50 and the storage system 52.

At a step 100b, the backup space on the backup storage system is allocated and prepared to receive the information to be backed up from the storage system 52, such as preparing a tape storage unit to receive the backup information. The space may be allocated based on the information in the DDTAB file. Thus, if the DDTAB file lists a set of hyper-volumes (or areas within hyper-volumes), a corresponding amount of space may be allocated on the backup storage system 54. In one embodiment, any redundant information (e.g., RAID parity information) is copied and backed up, as though it were data. In other embodiments, only user data is copied to the backup storage system 54.

At a step 100c, it is determined whether the backup will be off-line. An off-line backup does not allow the application running on the client 50 to read or write any data into or from an area of memory that is to be backed up during the backup process. If the backup is to be performed on-line, the application is permitted to read and write data from the memory that is to be backed up, during all of the backup process.

Assuming that the backup is to be performed off-line, at a step 101 the application is taken off-line.

At a step 102, it is determined whether the backup information is stored in a mirrored redundancy group.

If not, at a step 104a, the backup is performed. After the backup has been performed at a step 104b, the application can be brought back on-line and processing is complete (at a step 109).

If the off-line (step 100c) backup is being performed on a mirrored system (step 102), then the mirroring is "broken" at a step 103a. "Breaking" the mirrors severs the normal mirroring procedures (breaks the mirror links) in the storage system 52 for at least one of the copies of the mirror. In this embodiment, the mirrors are broken while the application is off-line to avoid the risk of data being written to some of the mirrors, but not all of the mirrors, while the mirrors are being broken. For example, the data to be backed up may exist on six different physical storage segments (hyper-volumes). In this case, six mirrors must be broken. The application is taken off-line while the mirrors are broken to avoid the risk (for example) that a write to all six of the hyper-volumes may occur after three of the hyper-volume mirrors have been broken but before all have been broken. With the application on-line, there is a risk that the data on some of the hyper-volume segments would be updated while the data on others would not.

At a step 103b the application is brought on-line. This permits the application to continue processing using a primary copy of the hyper-volumes (or copies, where there is more than two copies of data in the mirror group) while the backup is performed using the mirror copy that has been taken out of the mirror redundancy group.

After the backup has been performed, at a step 103d, the mirrored volumes can be brought back into the mirror redundancy group. This is done by resynchronizing the mirror volumes that were taken off-line and restoring the mirror connection. The backup processing may then be complete at step 109.

If the backup is to be performed on-line (step 100c), then it is first determined whether the backed up data is part of a mirror redundancy group, at a step 106a.

If not, the application is placed in on-line backup mode, at a step 105a. Thus, for example, if the application is the Oracle database, writes to data can be stored in a redo log, rather than done by writing to the physical storage system 52 storage components (e.g., 76a–76d and FIG. 7). This step effectively prevents any writing of information to the physical storage segments (e.g., hyper-volumes) for a period of time.

At a step 105b, the backup is performed. At a step 105c, the application is returned to its normal mode of operation and a redo log (now representing a log of what needs to be done to the applicable hyper-volumes as a result of the application having been placed in backup mode at step 105a) is archived. At a step 105d, the archived redo log is backed up to the backup storage system 54, and processing concludes at step 109.

If the on-line backup is being performed in a mirror redundancy group (steps 100c and 106a), the application is put into an on-line backup mode, at a step 106b.

After the application has been placed in an on-line backup mode, the mirrors may be broken, at a step 106c (corresponding to the breaking of mirrors at a step 103a).

At a step 106d, the application may be returned to normal mode and the redo log (now representing a log of what needs to be done to the applicable hyper-volumes as a result of the application having been placed in backup mode at step 106b) is archived.

The backup may then be performed using the mirrored copy at a step 106e.

After the backup has been performed, the mirrors may be resynchronized and the mirror facilities on the storage system 52 restored so that the mirrored copy is brought back into normal use. Processing may then be completed at step 109.

Returning to FIG. 8 step 84 and steps 103c and 106e of FIG. 10, the manner of executing the backup may depend on whether the client 50 and the backup storage system 54 use the same operating system (and, therefore can mount and read the same virtual partitions). If so, the backup storage system 54 may read information from the storage system 52 by mounting or importing virtual volumes (to get to the corresponding hyper-volumes) specified in the DDTAB file 98. Because the backup storage system 54 has a compatible operating system, the backup storage system 54 can logically read data stored on the storage system 52 over the direct connection line 60. In this case, backup of a file can be accomplished by the backup storage system 54 mounting or importing the applicable virtual volumes for the designated hyper-volumes and then copying only the file or files to be backed up. In this particular embodiment, that would correspond to a logical-logical backup performed over the direct connection 60.

If the client 50, however, specifies that a complete raw partition is to be backed up, the entire partition may be backed up over the direct connection line 60 on the physical level—without the backup storage system 54 mounting the storage devices in the storage system 52 or determining any logical-level information, such as what data corresponds to what file. In this case, the backup may be called a "physical" backup because the information stored on the physical storage device 52 is never converted to, or examined in, its logical (e.g., data file) form, but is rather copied directly from the storage devices (e.g. 76a–76d) in the physical storage system 52 to the backup storage system 54.

An embodiment of a method for restoring data on the embodiment of a backup storage system described above may now be considered. The restore process, when performed with a client 50 and a backup storage system 54 that use the same operating system, can be done at a logical level. If the data has been backed up at a logical level, the data restored may similarly be restored at the logical level. If the backed up data corresponds to a physical backup (e.g., where a complete partition was backed up at a physical level), the data may be restored at a physical level—e.g., all of the data within the partition copied exactly back to the appropriate locations (e.g., hyper-volumes) on the physical storage system 52 storage devices 76a–76d.

In the alternative, the restore may be performed at a logical level. For example, only specified files within the physical backup data on the physical storage system 54 may be restored. This can be done because the physical storage system 54 can mount or import and read the partition in its backed up form, because the backup storage system 54 uses the same file system and logical volume manager details.

While a logical restore from a physical backup is possible when the client 50 and backup storage system 54 are using the same operating system, a different scenario applies when the client 50 and backup storage system 54 use different operating systems. In particular, the backup process may not have been performed over the direct connection 60 at the logical level. The data stored on the physical storage system 52 may have been stored using one set of memory hierarchy assumptions (file system and logical volume manager level details) while the backup storage system 54 is capable only of reading data stored according to a different file system and logical volume manager level implementation. Accordingly, the data may have been backed up through a physical backup process. In this case, the level of granularity for the backup may be the partition level, i.e. only complete raw partitions (again, at the virtual partition level) may be backed up.

Similarly, the restore process may be required to restore data at the physical level. Thus, if a partition was backed up, an entire partition would need to be restored. The need to restore the entire partition (or whatever other level of granularity is employed at the physical level for backing up units of storage) may be created by an inability (or undesirability, due to performance or other considerations, in some cases) of the backup storage system 54 to read the physically backed up data at a logical level.

This can be problematic. Circumstances may arise where a user does not wish to restore a complete partition, but only one or more files within the partition. For example, the restore of the partition could overwrite some updated information, when the only file that needs to be restored to an earlier state is a small area (e.g., a logical element such as a file) within that partition. Thus, where the overall memory scheme of the client 50 and physical storage system 52 is not compatible at a logical level with the storage mechanism on the client 54 (e.g., because the operating system (or file system and logical volume manager levels) are different), the ability of a user or an application program to flexibly backup and restore application level (logical level) structures of data (e.g., files) can be significantly be impaired. Certain embodiments of the present invention may alleviate or solve this problem.

Figure 11:
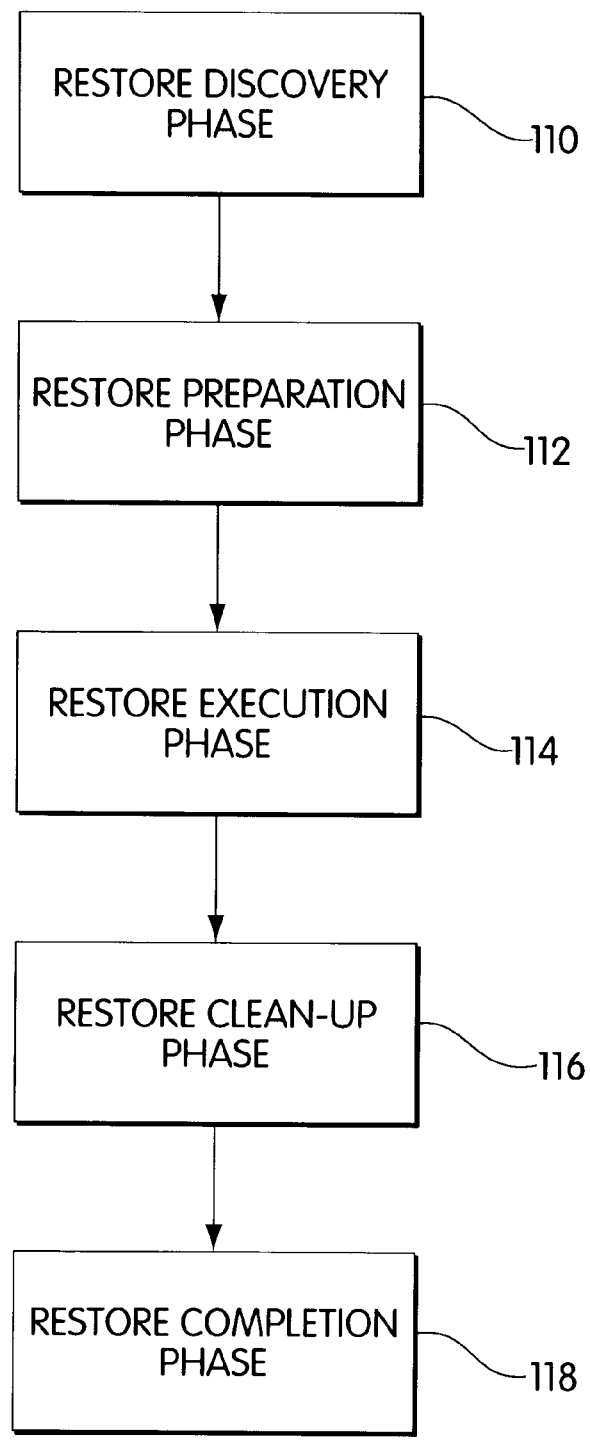
FIG. 11 illustrates one embodiment of a method for restoring data that has been backed up.

FIG. 11 illustrates one embodiment of a method for restoring backed up data using the backup storage system illustrated in FIG. 6. The embodiment in FIG. 11 illustrates the restore process for restoring data from a physical backup.

The process begins at a step 110, where a restore discovery phase process is performed.

The performance of the steps in FIG. 11 may be more readily understood if described separately for systems where the client 50 and backup storage system 54 are capable of mounting and reading data directly from the storage system 52 and systems where both the client 50 and the backup storage system 54 can not.

In a system where both the client 50 and backup storage system 54 can mount and read data on the storage system 52, the method of FIG. 11 begins at a step 110 by performing a restore discovery phase. This process is similar to the discovery process described above with reference to FIG. 8. The restore discovery phase takes a restore request logged on the backup storage system 54 (at the application level) and resolves that request into corresponding file systems, logical volume level, and physical storage level, information. The result is a restore DDTAB file, generally similar to the DDTAB file 98 of FIG. 9, created in the backup process.

The discovery data table for the restore process contains information which allows the backup storage system 54 to reconstruct the file on the target storage system 52 and allows the backup storage system 54 to interpret (e.g., mount or import, read and write) the contents of the storage system 52.

At a step 112, a restore preparation phase process is performed. The preparation phase process 112 may be similar to the backup preparation phase process described above with reference to FIGS. 8 and 10. Here, the affected file systems may be unmounted on the client (to prevent any read and write of the affected areas during the restore process), and mounted by the backup storage system 54. The restore process may then continue at a logical level at a step 114. As described above with reference to FIG. 10, in a mirrored system, the mirrors may be broken and the restoration process performed onto a mirrored copy. After the restoration is complete, the mirrors can be resynchronized and restored (as a part of the restore clean-up phase, step 116).

Figure 12:
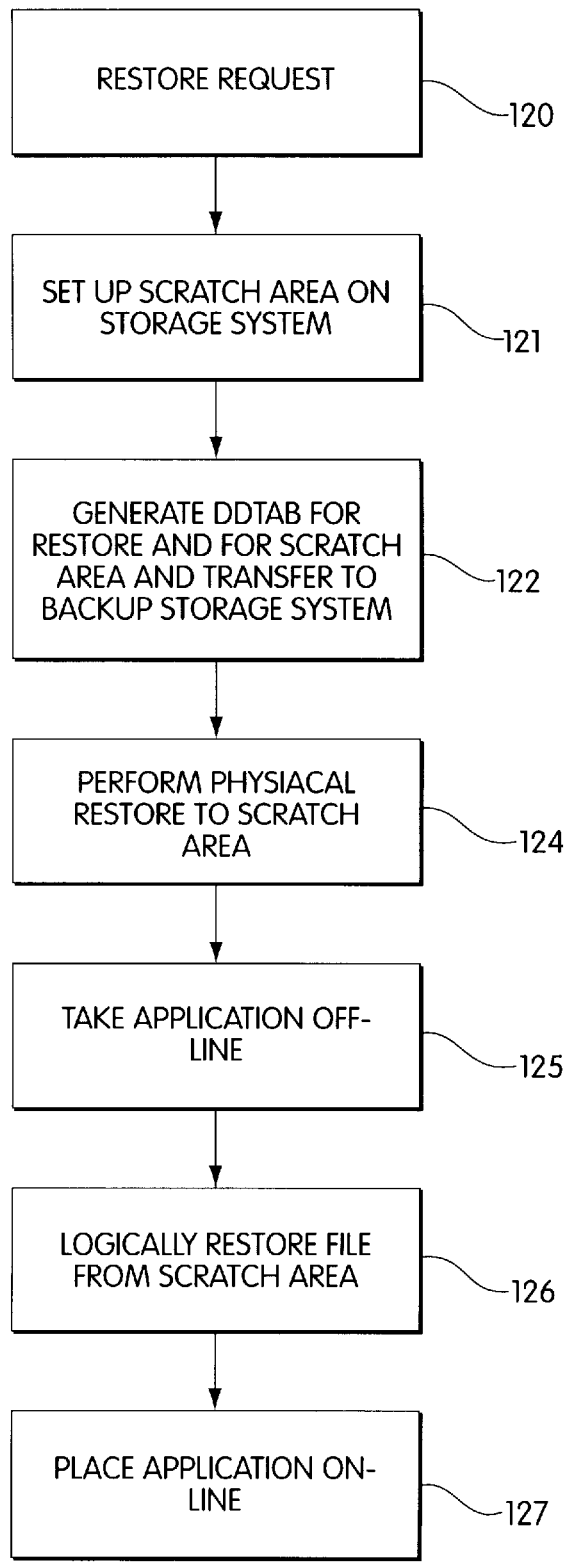
FIG. 12 illustrates one embodiment of a method for restoring data through use of a scratch area on the primary storage system.

FIG. 12 illustrates one embodiment of a method for logically restoring a file from within a larger segment of data (e.g., a raw partition) that was physically backed up, when the backup system 54 can not directly mount and read information on the storage system 52.

The process begins at a step 120 where a restore request is entered. This request may be entered directly onto the backup storage system 54, or communicated to the backup storage system 54 from the client 50 over the network 56 (or through any other mechanism).

At a step 121, a scratch area is set up on the storage system 52. This step may be performed by the client or the backup storage system 54, using the DDTAB file generated for the restore. The user may instead control setting up the scratch area by entering commands through either the client 50 or the backup storage system 54. The scratch area may be set up identically to the storage area for the primary copy that is being restored. Thus, if the primary copy of the data is stored across five hyper-volumes according to a particular parity redundancy scheme, the scratch area may be set up to have a five hyper-volume set which use the same redundancy scheme. The scratch area may be designated to be one of the mirrors, if the restore is for data in a mirrored redundancy group.

At a step 122, a DDTAB file is generated for the restore process. The DDTAB file may have a structure corresponding to the one illustrated and described above with reference to FIG. 9. In this case, however, the DDTAB corresponds to information for the (logical) file to be restored. Accordingly, the DDTAB file may be generated by the client 50 and storage system 52, as described above with reference to the backup process. This DDTAB file may then be communicated back to the backup storage system 54.

A DDTAB file (such as the DDTAB files described above) may also be generated for the scratch area. This DDTAB file will record the information for the scratch area, for the backup storage system 54 to write physically backed up data into the scratch area set up on the storage system 52, over the direct connection 60.

At a step 124, the physical restore is performed, but to the scratch area—not to the ultimate copy of the block of data from which the physical backup was prepared (e.g., not to the raw partition that was backed up) (with the potential exception of a restore to a mirror in a mirror redundancy group, as discussed below). This physical restore process is similar to a physical level restore done for a complete raw partition, but the restore is performed "out of place," rather than "in place." That is the restore is done to a location different than the area from which the backup was made.

If the restore is to a scratch area set up in a mirror, the restore may actually be to a location from which the data was physically backed up. At step 124, before the physical restore is actually performed, the mirror links to the (mirror) scratch area may first be broken. This may be done as generally described with reference to FIG. 10, or by some other means. (After the logical restore, described with reference to step 126, below, the mirror (scratch area) may also need to be resynchronized to the primary copy and the links restored, e.g., after step 127, described below.)

At a step 125, the application is taken off-line. The application may be prevented from processing the data while the restore is being performed. (As with the methods described in this embodiment, certain steps may be performed in a different order, as would be apparent to one of skill in the art based on the disclosure provided herein. Here, as just one example, a similar effect may be achieved if the user takes the application off-line at the time of requesting a restore, at step 120.)

At a step 126, the file that is to be restored can be taken at the logical level from the scratch area and restored into the working area. This step may be performed by software resident on the client 50—the client computer 50 being capable of mounting the file system (e.g. raw partition) in the scratch area on the storage system 52 and reading the data and files within the scratch area At a step 127, the restore having been completed, the application can be placed on-line again and any residual logging and clean-up functions performed.

Figure 13:
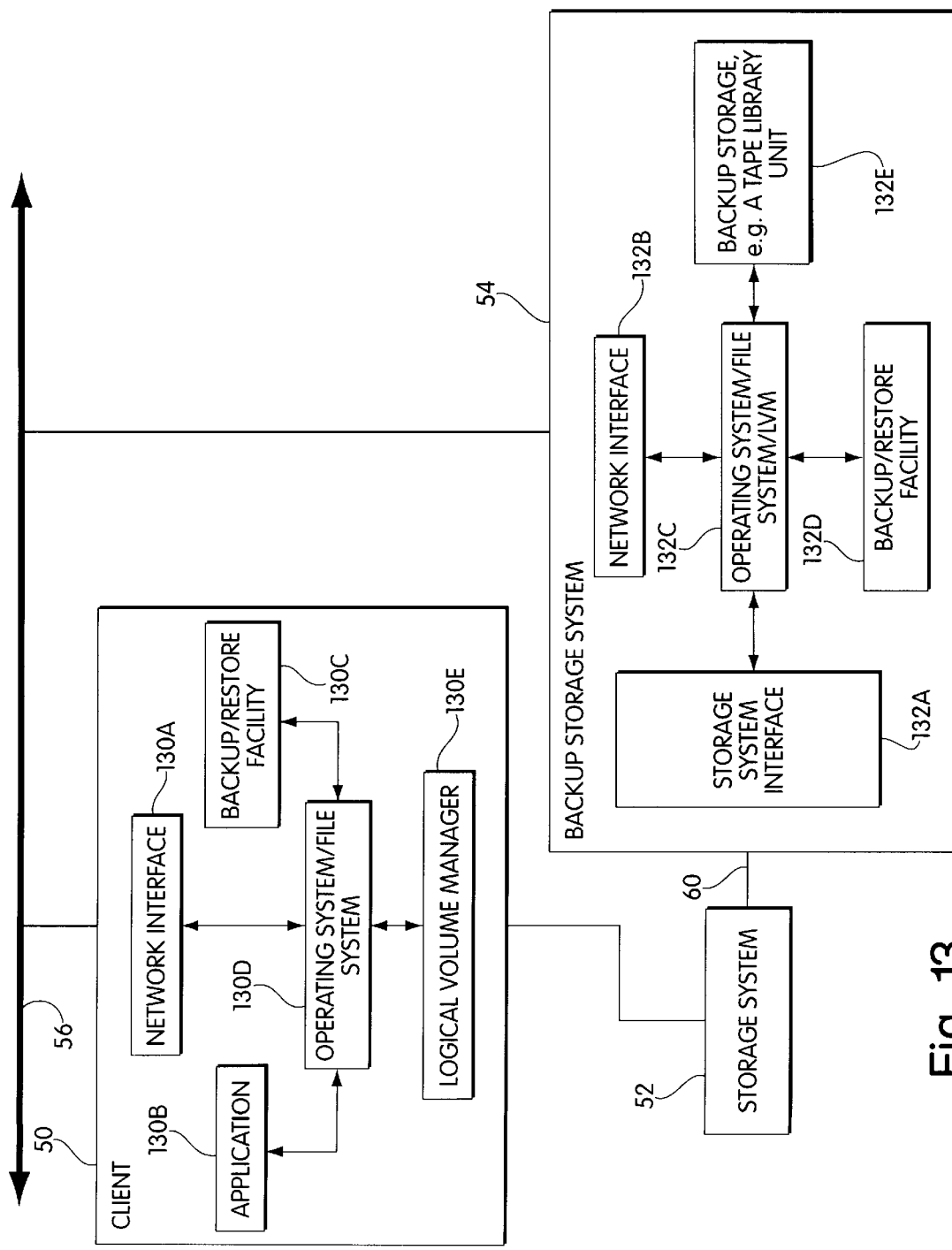
FIG. 13 illustrates one embodiment of a backup storage system, at a software module level.

FIG. 13 illustrates one implementation of the particular embodiment described above, at a modular level. At the client 50, software modules 130*a*–130*e* may be used to implement the various functions performed on the client with respect to the backup and restore process. The client 50 may include software 130*b* that performs an application (e.g., the Oracle database application mentioned above). The application 130*b* interfaces with the operating system which includes a file system level 130*d*. The logical volume manager 130*e* is used as a part of the interface to the storage system 52 (of course, the logical volume manager could be omitted or viewed as a part of the operating system and file system). Where messages are sent over the network (to the backup storage system 54 or otherwise) the operating system may call a network interface module 130*a*. As described above, the operating system/file system 130*d* may use a logical volume manager 131 interfacing with the storage system 52. The backup/restore facility 130*c* is another software module resident on the client 50 which can be used to perform the functions of the backup/restore process described above where initiated or performed by the client.

Similarly, the backup storage system 54 includes a backup/restore facility 132*d* which controls the backup and restore process functions performed by the backup storage system 54 as described above. The backup/restore facility 132*d* may run on an operating system/file system and logical volume manager as indicated at 132*c*. As described above, the operating system/file system/logical volume manager applications may or may not be the same as, or consistent with, the client 50 operating system/file system/logical volume manager 130*d*–130*e*.

As for the client 50, the backup storage system may include a network interface 132*b* for sending and receiving communications over the network 56. In addition, the backup storage system may include a storage system interface 132*a* for interfacing with the storage system 52.

When data is received by the backup storage system 54, the backup/restore facility may control, through the operating system 132*c*, the writing of that data to a separate backup storage facility such as an eight millimeter or a DLT tape library unit. This may be a separate stand alone storage device coupled to the remainder of the backup storage system (which may be implemented on a general purpose computer). The backup storage system may be connected to the backup storage 132*e* using a SCSI cable or any other mechanism.

Having thus described at least one illustrative embodiment of the invention, various modifications and improvements will readily occur to those skilled in the art and are intended to be within the scope of the invention. Accordingly, the foregoing description is by way of example only and is not intended as limiting. The invention is limited only as defined in the following claims and the equivalents thereto.

What is claimed is:

1. A method of backing up and restoring data in a computer system, the method comprising steps of:
   (a) performing a physical backup of a segment of storage stored on a primary storage device, onto a backup storage device, the segment of storage being used to store a plurality of logical elements; and
   (b) logically restoring one of the logical elements stored in the segment of storage.

2. The method of claim 1, wherein the backup storage device cannot read the segment of storage at a logical level.

3. The method of claim 2, wherein the step (a) comprises a step of:
   physically backing up the segment of storage over a direct connection between the primary storage device and the backup storage device.

4. The method of claim 2, wherein the step (b) comprises steps of:

(c) restoring a copy of the segment of storage to a scratch storage area; and logically restoring one of the logical elements from the copy restored to the scratch storage area.

5. The method of claim 4, wherein the scratch storage area is on the primary storage device.

6. The method of claim 5, wherein the scratch storage area includes a mirror storage location on the primary storage device.

7. The method of claim 5, wherein the step (c) comprises a step of copying the backup of the segment of storage from the backup storage device to the primary storage device over a direct connection.

8. The method of claim 4, wherein the logical element is a file; the segment of storage corresponds to a virtual partition; and the segment of storage is stored on a plurality of physical storage segments on the primary storage device.

9. The method of claim 2, wherein:

the primary storage device is used in a normal mode of operation by a primary computer; and the step (b) comprises a step of using the primary computer to logically restore the logical element.

10. A method of restoring data from a backup storage device to a primary storage device, the method comprising steps of:

(a) restoring a copy of a segment of storage to a scratch storage area, the segment of storage being used to store a plurality of logical elements; and (b) logically restoring one of the logical elements stored in the segment of storage from the copy restored to the scratch storage area.

11. The method of claim 10, wherein the scratch storage area is on the primary storage device.

12. The method of claim 11, wherein the scratch storage area includes a mirror storage location on the primary storage device.

13. The method of claim 11, wherein the step (a) comprises a step of restoring the copy of the segment of storage at a physical level to the scratch storage area over a direct connection between the primary storage device and the backup storage device.

14. The method of claim 10, wherein the backup storage device cannot read the segment of storage at a logical level.

15. The method of claim 14, wherein:

the primary storage device is used in a normal mode of operation by a primary computer; and the step (b) comprises a step of using the primary computer to logically restore the logical element.

16. A method of backing up and restoring data used in a computer system having a primary computer, a primary storage device and a backup storage device, the method comprising steps of:

(a) using the backup storage device to control backing up a segment of storage stored on the primary storage device by copying at a physical level the segment of storage from the primary storage device to the backup storage device; and (b) using the primary computer to logically restore a logical element stored in the segment of storage.

17. The method of claim 16, wherein the step (b) comprises steps of:

(c) restoring a copy of the segment of storage to a scratch storage area; and using the primary computer to logically restore one of the logical elements from the copy restored to the scratch storage area.

18. The method of claim 17, wherein the scratch storage area is on the primary storage device.

19. The method of claim 18, wherein the scratch storage area includes a mirror storage location on the primary storage device.

20. The method of claim 17, wherein the step (c) comprises a step of using the backup storage device to control restoring the copy of the segment of storage, by copying at a physical level the copy of the segment of storage from the backup storage device to the scratch storage area.

21. The method of claim 16, wherein the backup storage device cannot read the segment of storage at a logical level.

22. A backup storage system for backing up a storage device used by a primary computer, the backup storage system comprising:

means for controlling a physical backup of a segment of storage stored on the storage device; and means for logically restoring a logical element from the segment of storage.

23. The system of claim 22, wherein the means for controlling comprises means for physically backing up the segment of storage over a direct connection with the primary storage device.

24. The system of claim 22, wherein the means for logically restoring comprises:

means for restoring a copy of the segment of storage to a scratch storage area; and means for logically restoring one of the logical elements from the copy restored to the scratch storage area.

25. The system of claim 24, wherein the means for logically restoring to a scratch storage area comprises means for restoring the copy to the scratch storage area, the scratch storage area being on the storage device.

26. The system of claim 22, wherein the means for logically restoring comprises:

means on the primary computer for logically reading the logical element from a copy of the segment.

* * * * *

UNITED STATES PATENT AND TRADEMARK OFFICE
CERTIFICATE OF CORRECTION

PATENT NO.  : 6,047,294
DATED       : April 4, 2000
INVENTOR(S) : John Deshayes et al.

It is certified that error appears in the above-identified patent and that said Letters Patent is hereby corrected as shown below:

<u>Title page:</u>
[73] EMC Corporation, Hopkinton, MA

Signed and Sealed this

Twenty-eighth Day of August, 2001

*Attest:*

NICHOLAS P. GODICI
*Attesting Officer*   *Acting Director of the United States Patent and Trademark Office*